(12) United States Patent
Wright

(10) Patent No.: US 11,321,394 B2
(45) Date of Patent: May 3, 2022

(54) GRAPH PROCESSING SYSTEM

(71) Applicant: THATDOT, INC., Portland, OR (US)

(72) Inventor: Ryan Wright, Portland, OR (US)

(73) Assignee: thatDot, Inc., Portland, OR (US)

( * ) Notice: Subject to any disclaimer, the term of this patent is extended or adjusted under 35 U.S.C. 154(b) by 230 days.

(21) Appl. No.: 16/510,746

(22) Filed: Jul. 12, 2019

(65) Prior Publication Data

US 2020/0401625 A1    Dec. 24, 2020

Related U.S. Application Data

(60) Provisional application No. 62/865,882, filed on Jun. 24, 2019.

(51) Int. Cl.
*G06F 16/901* (2019.01)
*G06F 16/903* (2019.01)

(52) U.S. Cl.
CPC .... *G06F 16/9024* (2019.01); *G06F 16/90335* (2019.01)

(58) Field of Classification Search
None
See application file for complete search history.

(56) References Cited

U.S. PATENT DOCUMENTS

| | | | | |
|---|---|---|---|---|
| 6,338,055 B1 * | 1/2002 | Hagmann | ......... | G06F 16/24534 707/999.005 |
| 8,966,368 B2 * | 2/2015 | Kuramura | ............. | G06Q 30/00 715/717 |
| 2011/0302196 A1 * | 12/2011 | Bouillet | ............ | G06F 16/24568 707/769 |
| 2013/0103715 A1 * | 4/2013 | Beckman | ................ | G06F 9/547 707/770 |
| 2013/0191413 A1 * | 7/2013 | Chen | ..................... | G06F 16/245 707/769 |
| 2013/0262502 A1 * | 10/2013 | Majeed | ............. | G06F 16/24568 707/769 |
| 2015/0006606 A1 | 1/2015 | Fleury et al. | | |
| 2016/0048607 A1 * | 2/2016 | Raman | ............. | G06F 16/90335 707/798 |
| 2018/0212904 A1 * | 7/2018 | Smullen | ................ | H04L 67/322 |
| 2018/0285477 A1 | 10/2018 | Bik et al. | | |
| 2019/0171756 A1 * | 6/2019 | Patavardhan | ....... | G06F 16/3344 |

OTHER PUBLICATIONS

Yan Shvartzshnaider et al, "Into the Moana-Hypergraph based Network Layer Inderection", 16th IEEE Global Internet Symposium 2013, pp. 139-114.*

(Continued)

*Primary Examiner* — Uyen T Le
(74) *Attorney, Agent, or Firm* — Davis Wright Tremaine LLP

(57) ABSTRACT

A graph comprising nodes and edges is stored by a distributed system as a collection of nodes and half-edges stored with their respective nodes. A message processor is associated with a node as needed to process messages passed between nodes, such that a given node has zero or one message processor assigned to it at a given time. Queries of the graph are resolved by processing a first portion of the query at a first node, and forwarding the results with the remaining portions of the query to a node linked by an edge to the present node.

20 Claims, 13 Drawing Sheets

(56) References Cited

OTHER PUBLICATIONS

Yan Shvartzshnaider et al, "Publish/Subscribe on Top of DHT Using RETE Algorithm", A.J. Berre et al. (Eds.): FIS 2010, LNCS 6369, pp. 20-29, 2010. © Springer-Verlag Berlin Heidelberg 2010.*
Sutanay Choudhury et al, "Query Optimization for Dynamic Graphs", arXiv: 1407.3745v1 [cs.DB] Jul. 14, 2014, ACM, 13 pages.*
Facebook, Inc., "GraphQL Working Draft—Oct. 2016," http://spec.graphql.org/October2016/, copyright 2015, 125 pages.
Holzschuher et al., "Performance of graph query languages: Comparison of Cypher, Gremlin and Native Access in Neo4j," Proceedings of the Joint EDBT/ICDT 2013 Workshops, Mar. 2013, 11 pages.
International Search Report and Written Opinion dated Sep. 21, 2020, Patent Application No. PCT/US2020/038983, 16 pages.
Kosmatopoulos et al., "HiNode: an asymptotically space-optimal storage model for historical queries on graphs," Distributed and Parallel Databases 35(3):249-285, Sep. 14, 2017.
Pacaci et al., "Do We Need Specialized Graph Databases?: Benchmarking Real-Time Social Networking Applications," Proceedings of the Fifth International Workshop on Graph Data-management Experiences & Systems, May 2017, 7 pages.
Wright, "Quine: a temporal graph system for provenance storage and analysis—conference presentation slides," International Provenance and Annotation Workshop, Jul. 9, 2018, 11 pages.
Wright, "Quine: a temporal graph system for provenance storage and analysis," International Provenance and Annotation Workshop, Jul. 9, 2018, 4 pages.

* cited by examiner

GRAPH PROCESSING SYSTEM

CROSS-REFERENCE TO RELATED APPLICATION

This application claims priority from U.S. Provisional Application No. 62/865,882, filed Jun. 24, 2019, entitled "GRAPH PROCESSING SYSTEM," the content of which is incorporated by reference herein in its entirety.

BACKGROUND

Increasingly, graph databases and graph processing systems have been used to perform complex computational tasks, such as performing semantic queries, on data modeled as a graph. The use of graph databases and graph processing systems may convey a number of benefits, including the ability to model data in a way that more closely reflects the natural relationships between the various entities described by the data. However, graph database also suffer from a variety of drawbacks. For example, the ability of these systems to scale may be limited.

BRIEF DESCRIPTION OF THE DRAWINGS

Various techniques will be described with reference to the drawings, in which.

DETAILED DESCRIPTION

Figure 1:
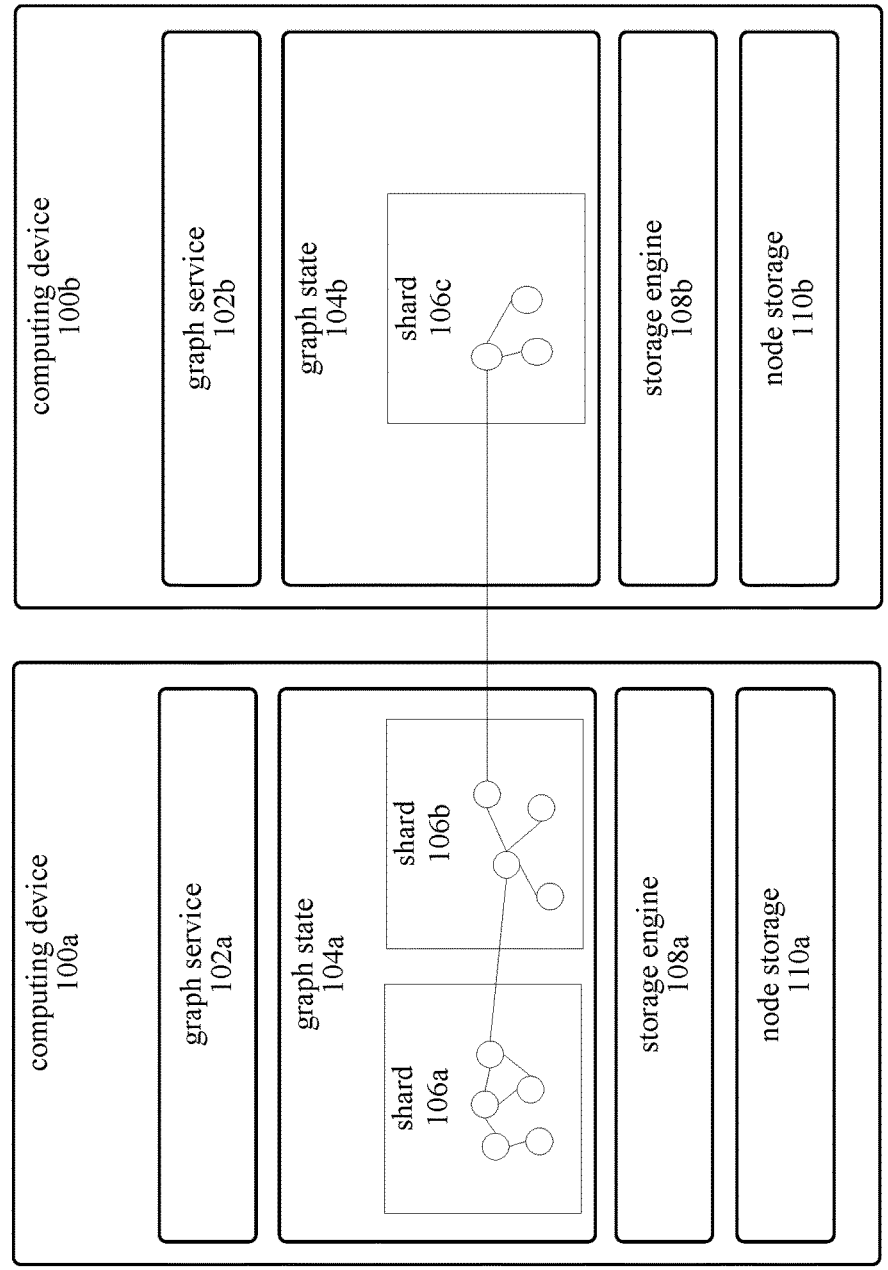
FIG. 1 illustrates an example of a graph processing system, in accordance with at least one embodiment.

Techniques and systems described below relate to graph databases and graph processing systems. In an example embodiment of a graph database or graph processing system, a node-centric architecture is employed. The nodes communicate via an asynchronous message-passing architecture, and each node's messages are processed by a message processor assigned to that node. Edges in the graph are represented by specialized node properties referred to herein as half-edges.

In a further aspect of the example embodiment, an edge between two nodes in a graph is stored by the embodiment as two half-edges. The half-edges are stored with their respective nodes. The half-edges are treated as a specialized type of property, where their key is the direction and type, and their value is the identifier of a node to which the edge refers. To represent properties associated with the conceptual notion of an edge between two nodes, the example embodiment stores an additional node with corresponding additional half-edges, so that an 'edge-node-edge' pattern represents an edge with properties. The properties associated with the edge are stored with this additional node.

In a further aspect of the example embodiment, each node in the graph is assigned a message processor, as needed. The message processor, which may also be referred to as an actor, functions as a single-threaded, lightweight, virtual processing unit. Interaction between nodes occurs via message passing between nodes. Each node is associated with a queue, which may sometimes be referred to as a mailbox, from which the message processor withdraws and processes messages.

In a further aspect of the example embodiment, a single logical graph may be spread across a number of computing devices. A computing device stores historical logs of events for its assigned nodes, and starts message processors to back each node as needed. The example embodiment determines whether a message should be delivered locally or remotely, and delivers the message to the computing device to which the message's target is assigned.

In a further aspect of the example embodiment, each node of the graph is uniquely identified by an identifier, comprising a sequence of bits whose length, subject to storage constraints, may be effectively unlimited. Nodes may also be identified by more meaningful types, such as via numbers, strings, universally unique identifiers, and so forth.

In a further aspect of the example embodiment, a message is passed to a node using the node's identifier. Sending a message to a node that has not previously been referenced will result in an actor being assigned to that node. The example embodiment further ensures that at any one time, only zero or one message processor is assigned to a given node. Message processors that are no longer needed for processing a particular node's messages are shut down, suspended, or assigned to other nodes.

In a further aspect of the example embodiment, data is stored on disk in a separate logical location for each node. Data is stored for a node as an append-only log of events representing changes made to that node, such as properties added, edges removed, and so forth. The events are stored together with a timestamp. When a node is started, a message processor is assigned to represent that node, the message processor reads the event log for that logical node, and replays the events in order, until the corresponding aggregated state of the node is reached. If no log exists, the example embodiment treats it as an empty log with no events to replay. In this way, all nodes functionally exist, even though only some nodes have a history already saved.

In a further aspect of the example embodiment, the system may also offer the ability to query historical states in the data. This is done by starting a node with instructions to replay the log until a specified moment in time. In some cases, a snapshot, also stored with a timestamp, of a previously computed state is used. The replaying of events may begin with a snapshot, which allows skipping events in the log before the snapshot's timestamp. Events subsequent to the snapshot's timestamp are then replayed up to the desired time. When the message processor backing the node reaches the specified time, it stops replaying the log and is available to handle messages, including messages related to the processing of queries. Historical states of a graph can be queried in the typical fashion by specifying the desired time in the query, and replaying each log only that far. The example embodiment thereby manages historical states so that a time the past is accessible in the same fashion as the present graph, and only the nodes required to answer a query are accessed or replayed to their historical state. In a further aspect of the example embodiment, queries that span historical ranges perform in a similar fashion such that when the desired starting time of the queries is reached during event replay, the query conditions are tested at each successive event until the replayed event's time stamp reaches the ending time from the query. The results over this period are aggregated and used to resolve the query over the specified time range.

In a further aspect of the example embodiment, queries provided to the system are converted to an intermediate representation for expressing queries over the graph data. The intermediate representation may comprise a tree structure. To process the intermediate representation, the example embodiment may translate the tree into a set, list, or other linear structure, and translate the structure into a result. This process is also invertible under certain circumstances such that, a result can used to produce a set, which can be used to produce a tree, which can be used to produce a graph corresponding to the query.

In a further aspect of the example embodiment, queries are provided to the system using a domain-specific language, e.g. one created by a user. For example, a user may define a class in a programming language, so that the class extends a defined trait. The example embodiment then translates a query, using the defined trait, to an intermediate representation that describes the pattern in the graph represented by the class defined by the user. A collection of such classes define the user's domain-specific language. This allows leveraging of the type system and type safety provided by the user's programming language, as well as related features that may be provided by an integrated development environment (IDE).

In a further aspect of the example embodiment, the system may also support other query languages, such as the graph query languages Gremlin, or Cypher. The example embodiment may, for example, convert a query provided in one of these languages to the intermediate representation, possibly comprising one or more literal operations on the graph. Likewise, the example embodiment may support SQL and other structured query languages, which assumes that data is modeled in a relational format, by converting a domain-specific term to a query portion expressed in the embodiment's intermediate language representation. When processing the query portion, the example embodiment returns a set of instances of that type, and structures the result as a relational table.

In a further aspect of the example embodiment, the system evaluates a query by delivering an intermediate representation of the query to a selected first node. The node may be selected using an indexing technique, as described below. The node then evaluates the portion of the query represented by the root of the tree-like structure of the intermediate representation. The results of this process may determine how to process the remainder of the query. For example, the next step might be to return no results if the data on the node does not match the head of the tree, or by routing the remainder of the query to another node connected with the current node by an appropriate edge. Query evaluation may therefore be described as an iterative process of receiving the query, evaluating one step in the intermediate representation on a given node, and relaying the results and remainder of the query to the next appropriate nodes.

In a further aspect of the example embodiment, queries can be issued for the purpose of extracting data, or inputting and persisting data into the system. The example embodiment may match the appropriate section of the query to existing data. For example, a command to create a specific sub-graph structure in the data begins by the system pre-processing the query to understand where that structure would semantically belong in the existing graph. A sub-graph may refer to a region within a graph, such as a subset of graph nodes that conform to a particular pattern. The system then begins at the position where the structure belongs and matches it to existing data first, creating new data where there is deviation from what already exists. This process may not require the user to know the internal identifiers used by the system. So if a client device issues a command to create the structure: A→B→C, where A→B already exists, the system would add, to B, an edge pointing to the new node C. In the example embodiment, this semantic matching to existing data does not require using identifiers or other information internal to the system.

In a further aspect of the example embodiment, a query is resolved into tree structure expressed in an intermediate representation. The structure, or a portion thereof, is delivered to each successive node. The example embodiment may store these portions, together with data received from prior processing of the graph, for later use. By persisting the query together with each node in the graph, queries can be lazily evaluated, even after long periods of time, or after interrupted execution, such as when the database is restarted. The example embodiment may support execution of a query as a standing query that is persisted in the graph in this fashion. A standing query may be associated with a callback function that includes instructions for responding to various conditions, such as where a node 1) initially matches the query; 2) initially does not match the query; 3) initially did not match the query, but does subsequent to a change to the node's data; and 4) initially matched the query, but no longer matches due to a change to the nodes data.

In a further aspect of the example embodiment, with respect to a standing query, the system stores the result of each successive decomposition of a query, into smaller and smaller branches, or portions, on the node issuing that portion of the query. The query portions issued to the next node is essentially a subscription to the next node's status as either matching the query, or not. Changes in the next node's state result in a notification to the querying node. In this way, a complex query is relayed through the graph, where each node subscribes to whether the next node fulfills the smaller query. When a complete match is made, a message processor selected to handle the notification is provided with the results and the appropriate callback is invoked. These callbacks may return results, but may also execute arbitrary functionality, such as initiating new queries, or even rewriting parts of the graph when certain patterns are matched.

In a further aspect of the example embodiment, the system also supports queries of a past state of the graph, by leveraging a capability to replay a node's event log up to a specific point in time. This permits a prior historical state to be queried and retrieved in the same way that the current state is queried and retrieved. In a further aspect, the example embodiment may support a query of graph patterns through ranges of history, including all time. Standing queries can be issued before node event replay occurs to effectively query throughout the entire history of the graph, or for a specific time range, to determine whether a specific query pattern ever existed in the past data.

In a further aspect of the example embodiment, the system provides fine-grained control over consistency trade-offs. For example, if the atomicity, consistency, isolation, and durability ("ACID") properties are desired, a query may indicate that the relevant nodes should be locked, so that competing queries do not have the ability to alter the state of a node before the entire query finishes. If higher throughput is desired, a query may indicate that a less restrictive consistency mode, such as eventual consistency, can be used. The example embodiment permits these choices to be made when the query is issued. Moreover, using the same data, queries with alternative consistency requirements may execute simultaneously.

In a further aspect of the example embodiment, the system may provide a consistent view for reading data by pinning an incoming query to the specific historical moment in which the query was received. If a user chooses to issue a query to read data live, e.g. out of the "present" moment of the graph, the query can be executed in the fashion as described above but collecting the relevant timestamp at each node for each step through the query. The final results of the query may be returned along with consistency bounds describing the window of time over which the complex query structure was resolved on the live graph.

In a further aspect of the example embodiment, the system maintains indexes used to find an initial set of nodes for processing a query. A variety of index types may be employed. The example embodiment may, for example, maintain a set of "index nodes" that are stored in the graph along with other nodes. Each of these index nodes may comprise a collection of node identifiers which currently have a specific property key or edge type. When a node adds a relevant property or edge, it notifies the corresponding index node to add its identifier to the index node. Likewise, when a node removes the property or the last instance of that edge type, it notifies the index node to remove its identifier from the index node. The index nodes are stored in the graph along with all other data and behave in the same fashion as any other node. This may include versioning the node and maintaining and querying its history. Consequently, when a query needs to be performed on a historical state, the query can use the index as it was at that moment in time for finding the right set of starting nodes at the relevant moment.

As described above, query resolution can be viewed as a series of nodes that subscribe to results of the next node's satisfaction of the remainder of the query. In a further aspect, the example embodiment uses this facility to perform automatic indexing in the live graph. When a query might have to traverse through a node with many matching edges as candidates for the next step of the query, it may impeded performance to inspect all possibilities at query time. To mitigate this, the example embodiment may allow for conditions to be set on a node, which then trigger that node to automatically subscribe to values present on the adjacent nodes. When a query arrives, the node that met these conditions has already subscribed to the state of each connected node and built an index of their values. So instead of exploring all possible connections by relaying to potentially millions of nodes, an efficient local index lookup can take the place of a potentially expensive query step.

In a further aspect of the example embodiment, the system includes the ability to define complex schema constraints, such as those that might be defined with sophisticated logical expressions on large, complex graph structures, either before data is loaded, or afterwards. Another example, in a further aspect, includes attempts to create a structure that violates the stored constraint yields a schema violation error. These and other constraints may be enforced by structural type-checking in the graph whenever an operation encounters data elements that are constrained.

In a further aspect of the example embodiment, the basic unit of computation for the graph is the node, and the node is also the basic unit of data storage. Each node is represented by an event log. Moreover, the example embodiment may support multiple, swappable backends for storing each node's event log. The structure of this storage architecture is essentially that of a key-value store. For each node identifier, functioning as a key of a key-value pair, the backend stores the event log, which functions as the value. Depending on the storage backend, this can be made more efficient by only storing the latest event, instead of rewriting the entire event log.

In a further aspect of the example embodiment, multiple backends are supported. Examples of backends include distributed data stores, as well as distributed, cryptographically secured data stores, such as those based on blockchain technology.

The example embodiment just described is intended to provide an illustration of the various systems, techniques, and computer-program products described herein. However, this illustration should not be construed so as to limit the scope of the present disclosure to only those embodiments which employ each of the various aspects just described. In particular, as would be appreciated by one of skill in the art, various embodiments may omit or alter certain aspects of the example embodiment. As such, no one aspect should, unless explicitly stated, be considered an essential element. Moreover, embodiments may combine certain of the above elements, as dictated by the constraints of logic, while omitting certain other aspects.

FIG. 1 illustrates an example of a graph processing system, in accordance with at least one embodiment. A graph processing system refers to any of a variety of systems or devices that perform operations, such as semantic queries, on graph data. These may include graph databases and graph processing systems. Herein, these terms are used interchangeably, and the term graph processing system is used in a manner intended to encompass systems of either type.

Conceptually, a graph is made up of a set of nodes connected by edges. The nodes and edges may be associated with properties that provide additional information about the nodes or edges. Within the graph, the nodes may represent entities, and the edges may describe relationships, or links, between entities. A property may provide information applicable to the corresponding entity or relationship.

Although the term node may be used, depending on context, to refer to the conceptual notion of a node, it may also be used, depending on context, to refer to a storage structure used by various embodiments of the graph processing system disclosed herein. Likewise, the term edge may, depending on context, refer to the conceptual notion of an edge, or to data stored by the system to represent an edge.

In the example of FIG. 1, a distributed graph storage and processing system 100 comprises a number of computing devices, such as the depicted computing devices 100*a,b*. The computing devices 100*a,b* each comprise modules for implementing the various techniques described herein. For example, the computing devices 100a may comprise a graph service module 102a and a storage engine module 108a. A module, as used herein, comprises computer-executable instructions that, when performed by one or more processors of a computing device, cause the computing device to perform one or more functions of the module.

In at least one embodiment, the graph service 102a performs functions related to maintaining a graph state 104a. This may include allocating message processors to nodes, routing messages between nodes, initiating query processing, and so forth.

In at least one embodiment, the storage engine module 108a performs functions related to storing and retrieving data. This may include interfacing with a memory or storage device in order to store or retrieve node-related data.

The computing device 100a may further comprise memory and storage for a graph state 104a. The graph state 104a may, for example, be held in random-access memory of the computing device 100a, or on a persistent storage device, such as a solid-state disk drive.

In at least one embodiment, the state of a graph managed by the graph processing system 100 is kept in various shards 106a-c. Each of the computing devices may maintain one or more of the shards 106a-c. For example, as depicted in FIG. 1, the first computing device 100a maintains two of the shards 106a,b, and the second computing device 100b maintains another shard 106c of the graph state 104b. As depicted in FIG. 1, the graph may comprise links between nodes maintained in different shards. Moreover, shards may be linked even when maintained by different computing devices.

The computing device 100a may further comprise node storage 110a. In at least one embodiment, the node storage 110a comprises a storage device, such as a solid-state disk drive, for storing data associated with various nodes of the graph.

Other computing devices in the graph processing system 100, such as the depicted second computing device 100b, may be architected similarly to the depicted first computing device 100a, comprising a graph service 102b, storage engine 108b, and node storage 110b. The second computing device 100b maintains, on the node storage 110b, a portion of the graph state 104b, including the shard 106c.

Figure 2:
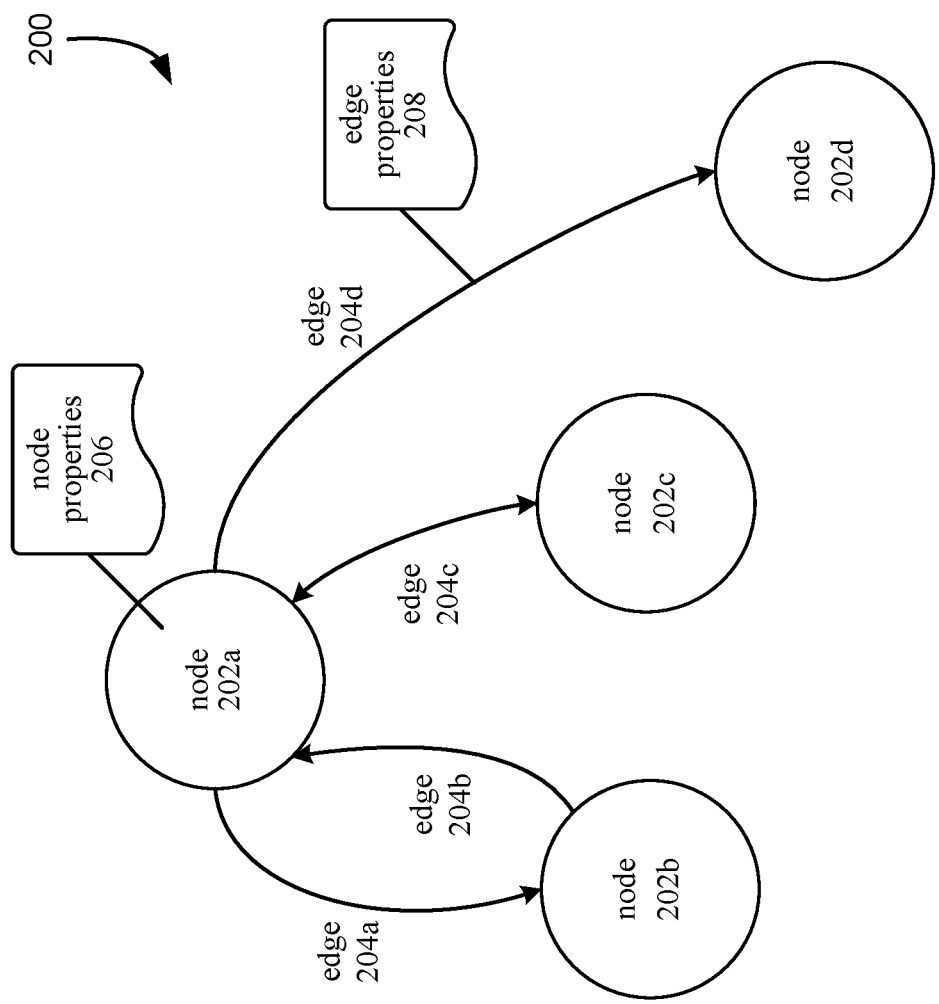
FIG. 2 illustrates an example of a graph maintained by a graph processing system, in accordance with at least one embodiment.

FIG. 2 illustrates an example of a graph maintained by a graph storage and processing system, in accordance with an embodiment. In particular, the example depicts a conceptual view of a graph 200 that may be maintained by embodiments of the graph processing system described herein. Disclosed herein are various techniques for storing and retrieving data modelled according to the conceptual depiction, in FIG. 2, of a graph.

In the example of FIG. 2, the graph 200 comprises nodes 202a-d connected by edges 204a-d. It will be appreciated that the depicted graph 200 is intended to be illustrative rather than limiting, and as such should not be construed so as to limit the scope of the present disclosure to only those embodiments that conform to the specific example provided.

Any of the nodes 202a-d may be associated with one or more node properties 206. A node property includes information about the node, and in particular about the entity that the node represents.

The edges 204a-d describe relationships between the nodes. In at least one embodiment of a graph, an edge may be unidirectional or bidirectional. Thus, in the depicted graph, a node 202a is linked via a unidirectional edge 204a to a second node 202b, and to a third node 202c via a bidirectional edge 204c. This third node 202c is linked by the same edge back to the first node 202a.

Any of the edges 204a-d may be associated with one or more edge properties 208. An edge property includes information about an edge, such as information pertaining to the relationship between nodes linked by the edge.

Figure 3:
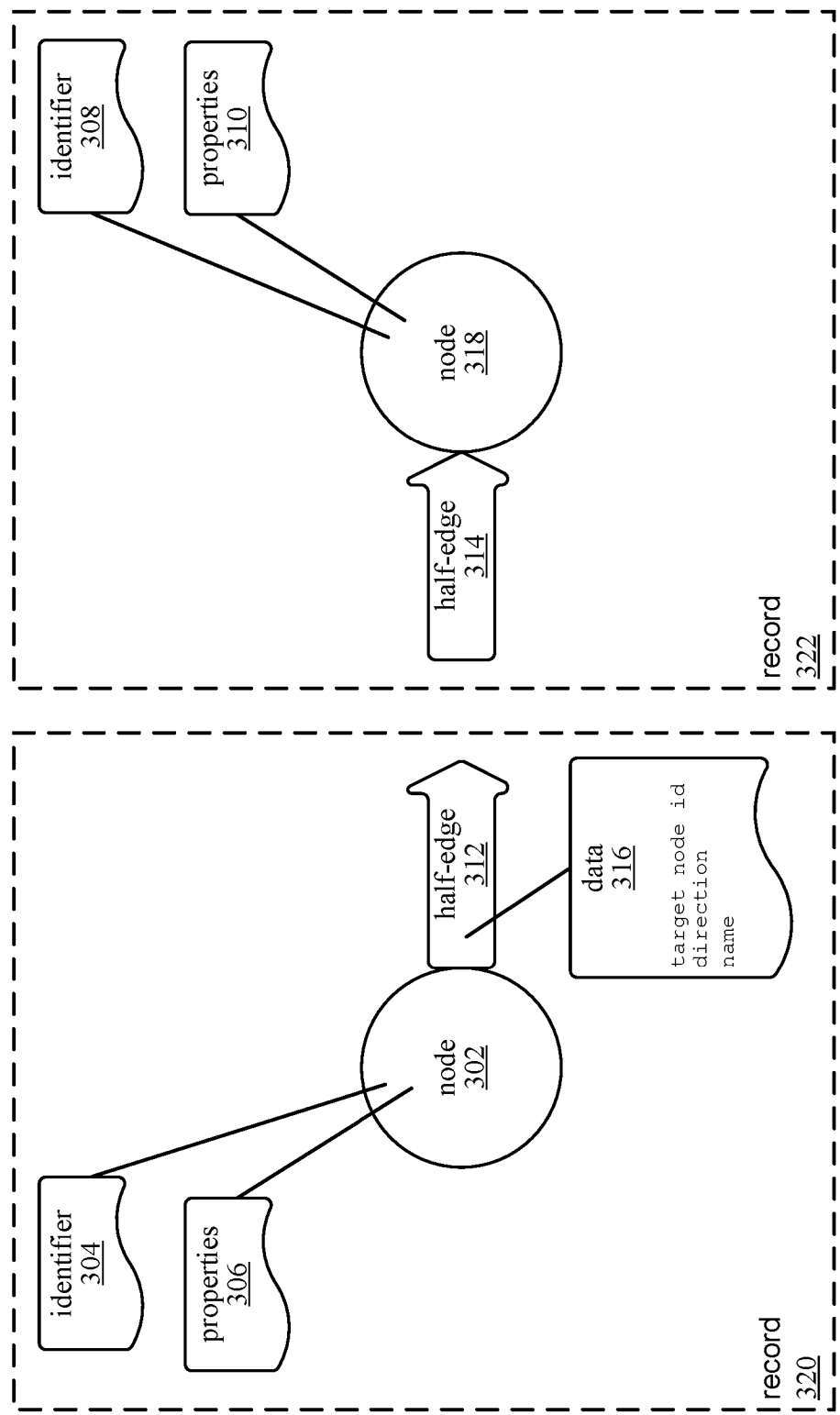
FIG. 3 illustrates an example of node data structures, in accordance with at least one embodiment.

FIG. 3 illustrates an example of node data structures, in accordance with at least one embodiment. For purposes of the example 300, assume that a graph processing system stores data for a graph in which the first node 302 is linked to the second node 304 via a unidirectional edge. These two nodes, and the relationship between them, is stored by the system as two records 320, 322, each representative of a corresponding one of the nodes 302, 304.

The first record 320, representing the first node 302, comprises a node identifier 318, zero or more node properties 306, and data describing a first half-edge 312. The edge data 316 may comprise an identifier of a node to which the edge refers, a direction of the half-edge 312, and a name of the half-edge.

The second record 322, representing the second node 304, may likewise comprise a node identifier 308, zero or more node properties 310, and a data describing a second half-edge 314. The data describing the second half-edge may include an identifier of the node from which the edge originates, data indicating the direction of the half-edge 314, and a name of the half-edge.

The first and second half-edges 312, 314 collectively define a link from the first node 302 to the second node 304. Note that the first half-edge 312 is stored as part of, or in association with, the record 320 that represents the first node. Likewise, the second half-edge 314 is stored as part of, or in association with, the record 322 that represents the second node 304.

In at least one embodiment, half-edges are stored as a type of property, similarly to other node properties, but allowing for many edges with the same key.

In at least one embodiment, messages are transmitted between nodes based on the half-edge information. For example, the data 316 associated with the half-edge 312 of the first node 302 may include an identifier of the target node, which in this case is the identifier 308 of the second node 304.

Figure 4:
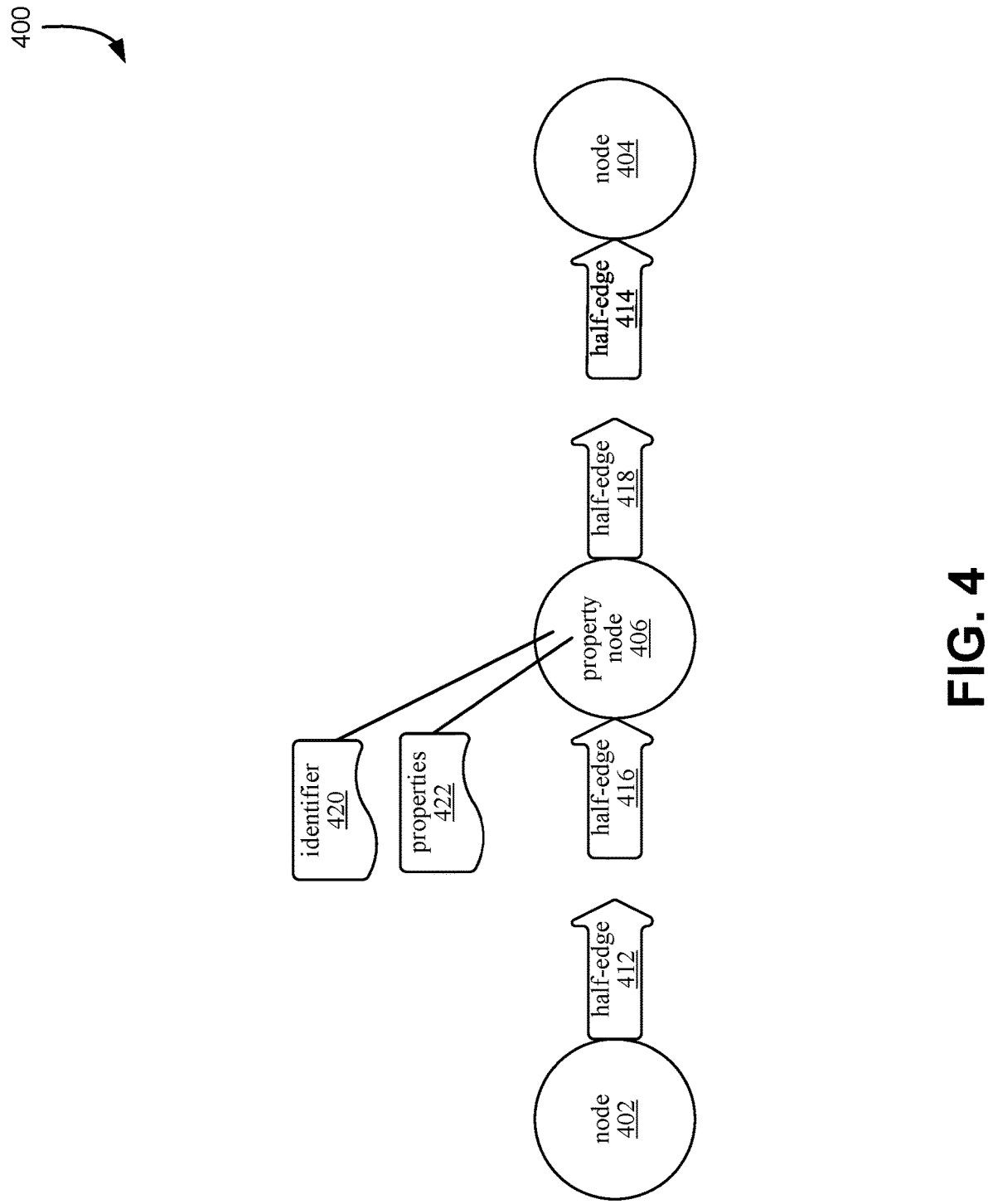
FIG. 4 illustrates an example of edge property data structures, in accordance with at least one embodiment.

FIG. 4 illustrates an example of edge property data structures, in accordance with at least one embodiment. For purposes of the example 400, assume that a first node 402 is linked in a graph to a second node 404, similarly to nodes 302, 304 depicted in FIG. 3, or to the nodes 202a and 202d in FIG. 2. Further assume that the edge linking these two nodes has one or more properties. It will be appreciated that this example is intended to be illustrative rather than limiting, and as such should not be construed so as to limit the scope of the present disclosure to only those cases and embodiments that conform to the specific example provided.

In at least one embodiment, the properties associated with the edge are stored according to the structure depicted in FIG. 4. As depicted in FIG. 4, these properties are stored in a property node 406. The property node may be linked to the other nodes via a set of half-edges. For example, in at least one embodiment, the first node 402 comprises a half-edge 412 associated with the property node 406, and the property node 406 comprises a half-edge 416 associated with the first node 402. Likewise, the property node 406 comprises a half-edge 418 associated with the second node 404, and the second node 404 comprises a half-edge 414 associated with the property node 406. Note that here, with respect to a node that comprises a half-edge, the half-edges association with another node refers to an incoming or outgoing link to the other node. The property node 406 may also contain an identifier 420 and properties 422, similarly to other node types.

Figure 5:
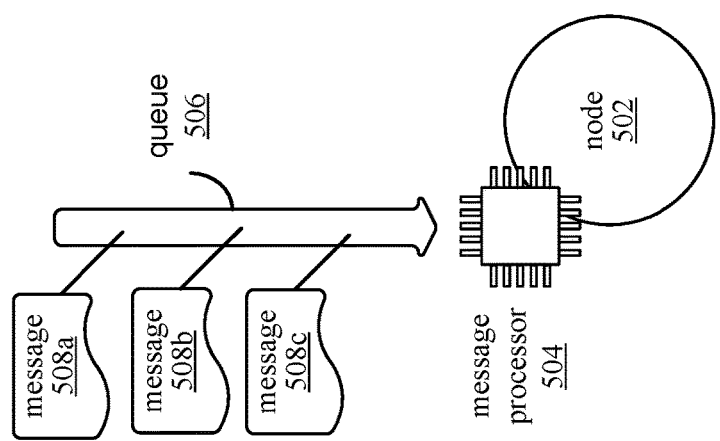
FIG. 5 illustrates an example of node message processing, in accordance with at least one embodiment.

FIG. 5 illustrates an example of node message processing, in accordance with at least one embodiment. In the example 500, a node 502 of a graph is associated with a message processor 504 and a queue 506.

In at least one embodiment, the queue 506 stores messages 508*a-c* that are directed to the node 502. For example, the queue 506 may store messages addressed to the node's identifier. The messages 508*a-c* are stored in a defined order, such as according to a timestamp.

In at least one embodiment, the graph processing system assigns exactly one message processor 504 to a node 502 of a graph. In these embodiments, a node of a graph, at any one time, may have either zero or one message processor 504 assigned to it.

In at least one embodiment, the graph processing system assigns a queue 506 to the node 502 when at least one unprocessed message is directed to the node.

In at least one embodiment, the message processor 504 removes a message 508*c* from the queue 506 in accordance with the defined order. For example, the messages 508*a-c* may be stored in the queue based on a timestamp, so that earlier-timestamped messages may be removed and processed prior to later-timestamped messages.

A message, such as any one of the messages 508*a-c*, may refer to instructions to perform an operation on the graph. Some messages may be described as comprising multiple portions, in that such a message might contain a portion applicable to the node 502, and one or more additional portions applicable to other nodes in the graph. The message processor 504 may therefore process the portion applicable to the node 502, and then forward the message to one or more other nodes. When forwarding a message, the message processor 504 may attach, to the message, results or status information pertaining to its handling of the message.

Figure 6:
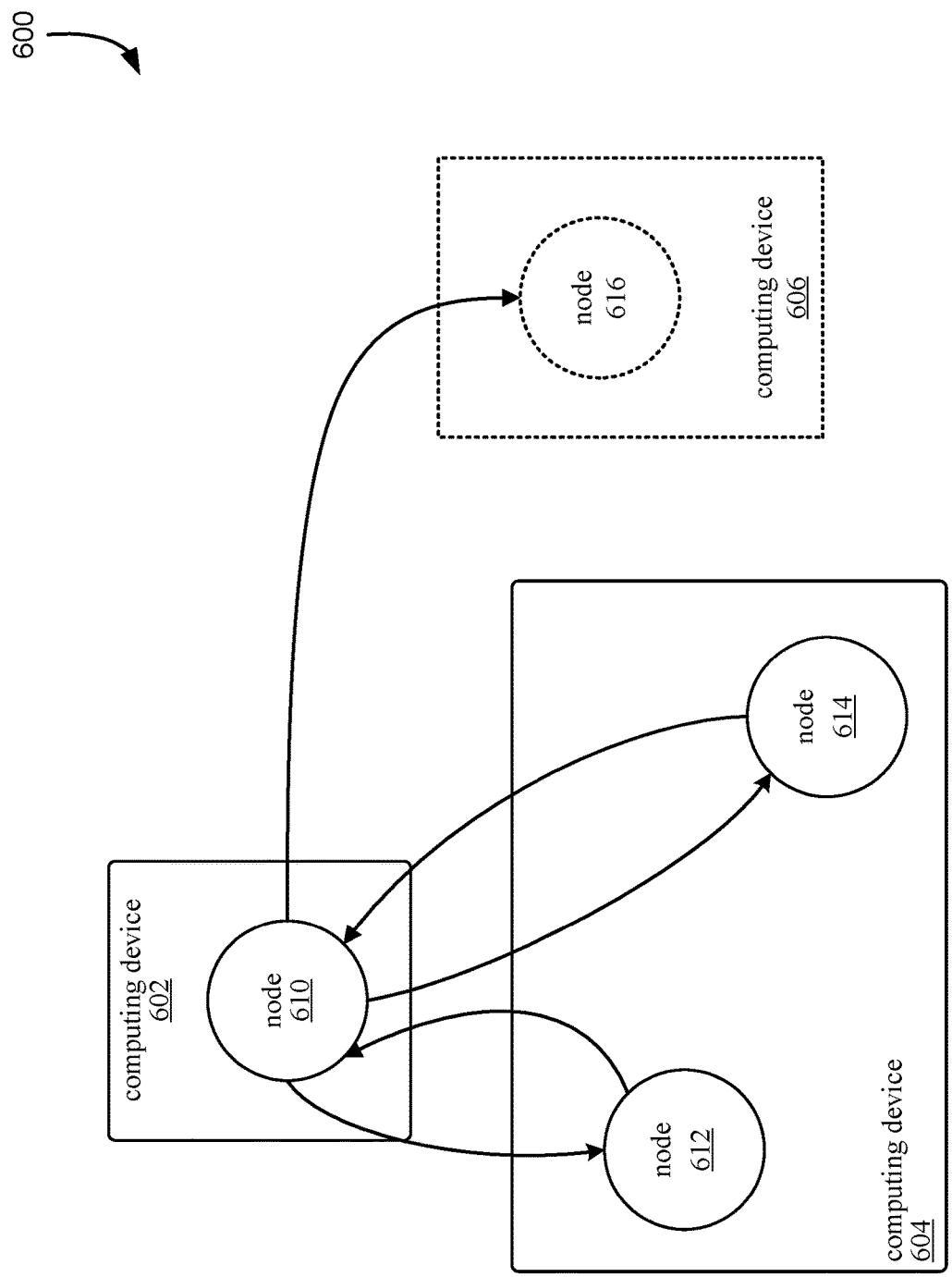
FIG. 6 illustrates an example system for scalable graph processing, in accordance with at least one embodiment.

FIG. 6 illustrates an example system for scalable graph processing, in accordance with at least one embodiment. For illustrative purposes, the example 600 of FIG. 6 describes a graph processing system comprising a plurality of computing devices 602-606. The scalability of the example system is achieved, in part, by a technique in which memory and processing resources for nodes are unallocated until needed. Moreover, the example system may permit the graph to be of considerable size and complexity, even when the memory or processing capability of the system is limited.

For illustrative purposes, the example 600 of FIG. 6 assumes a conceptual graph comprising various nodes 610-616. Here, the term conceptual graph refers to the entirety of the graph not being backed, at a given time, with memory or processing capacity assigned to each and every node in the graph. In particular, while a first computing device 602 might store records, such as node state and messages, for one of the graph nodes 610, and a second computing device 604 might do likewise for other nodes 612-614, there might be some nodes for which no such resources have been assigned. The node 616, for example, might have no storage or processing capacity allocated to it.

In at least one embodiment, a computing device 606 is associated with a node 616 based in part on a message being directed to the node 616. The graph processing system may determine that such a message exists and should be processed at the present time. The system may further determine that none of the presently assigned computing devices 602, 604 have sufficient capacity for processing messages directed to the node 616. In response, the system determines to assign an unused or under-utilized computing device 606 to the node 616. In particular, in at least one embodiment, the system assigns a message processor, such as the message processor depicted in FIG. 5, to process messages directed to the node 616. The system then forwards the message to the computing device 606 for processing by the assigned message processor. The system, in at least one embodiment, also allocates storage on the computing device 606 for storing the node's data.

Figure 7:
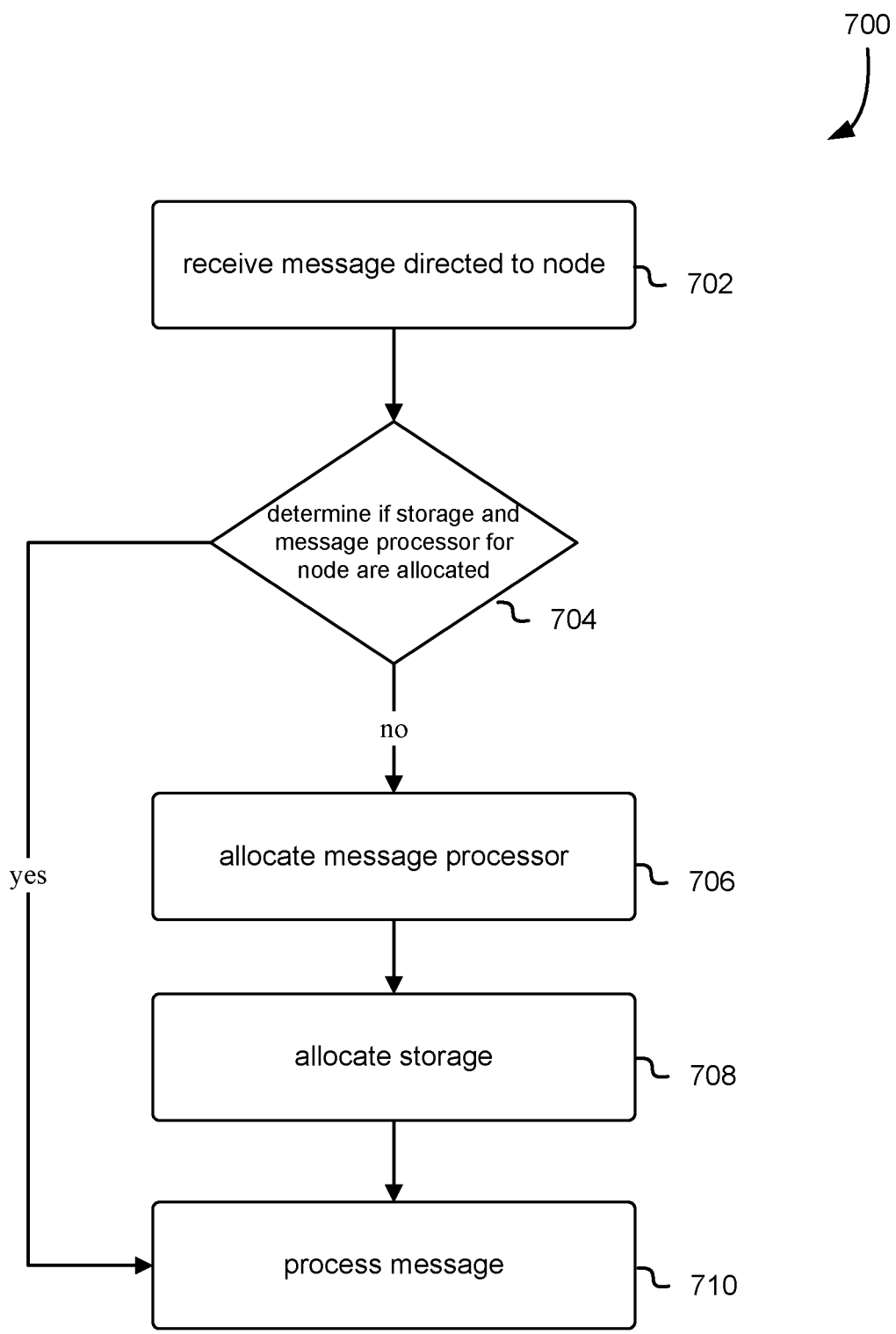
FIG. 7 is a flow diagram illustrating an example process for processing a message directed to a node of a graph, in accordance with at least one embodiment.

FIG. 7 is a flow diagram illustrating an example process for processing a message directed to a node of a graph, in accordance with at least one embodiment. It will be appreciated that the sequence of steps depicted in FIG. 7 is intended to be illustrative. In various embodiments, the example process may be performed using a sequence of steps that differs from the depicted sequence. For example, except where logically required, such as when the output of one step is used as input for a subsequent step, the depicted steps may be altered, omitted, combined with other steps, or performed in parallel.

Figure 13:
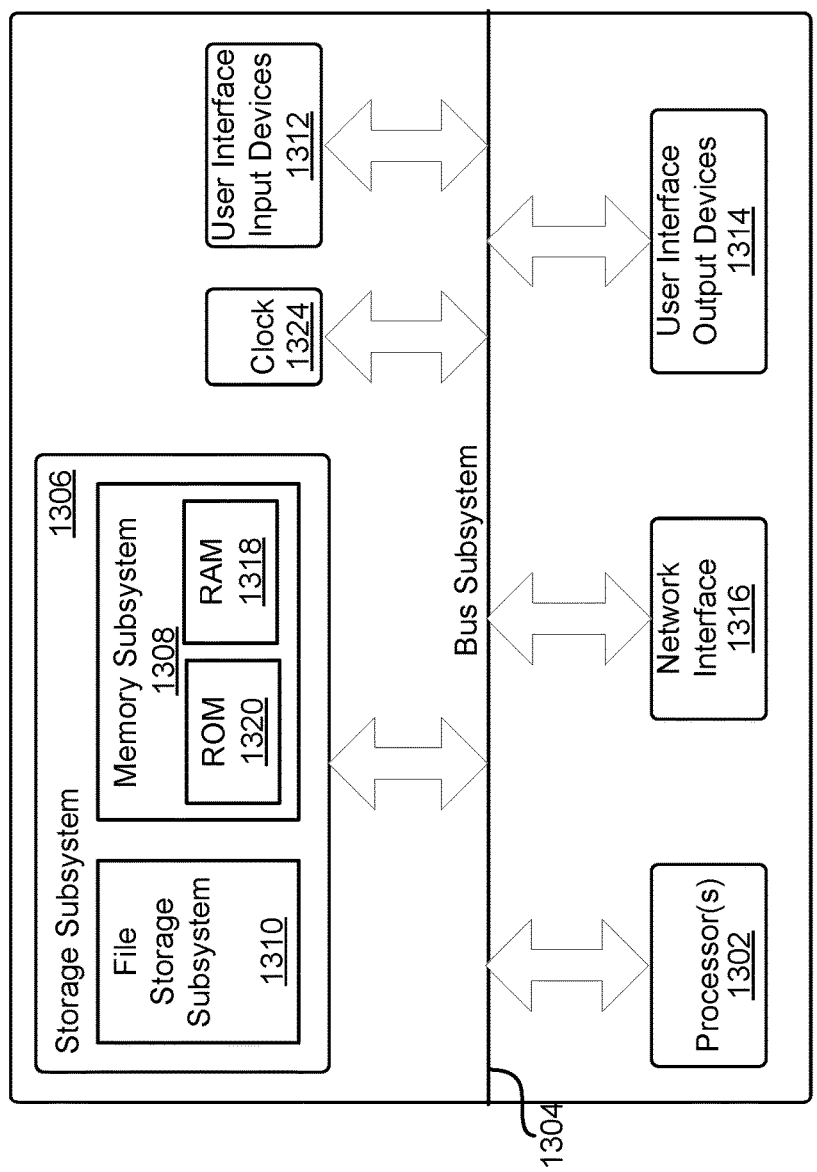
FIG. 13 illustrates an environment in which various embodiments can be implemented, in accordance with an embodiment.

The example process 700 of FIG. 7 may be performed on any suitable computing system, or combination of computing systems, such as by the graph processing system depicted in FIG. 1, or by one or more of the computing device depicted in FIG. 13. In at least one embodiment, the example process 700 is performed by a graph service module of a graph processing system, such as any one of the graph service modules depicted in FIG. 1. In at least one embodiment, the example is performed by a module configured to at least manage communications between shards, or partitions, of the graph.

At 702, the graph processing system receives a message directed to a node. The message, in at least one embodiment, comprises information identifying the node, or nodes, to which the message is directed. The information may include a unique identifier of the node, a path to the node, criteria for locating the node, and so forth. In at least one embodiment, if a unique identifier is not included in the message, the graph processing system will use the other information to obtain the unique identifier of a node to which the message is directed. The identifier is used, in at least one embodiment, to route the message to a message processor.

In at least one embodiment, the message is added to a queue for subsequent processing by a message processor.

At 704, the graph processing system determines if storage and a message processor are allocated for the node. As described regarding FIG. 6, the graph processing system may defer allocating resources to the node until a message is directed to the node. Accordingly, when a message is received, the graph processing system may determine if the node has already been instantiated by allocating storage and a message processor to it. If these resources have been allocated, the system can proceed to process the message, at step 712. If not, the process continues at step 706.

At 706, the graph processing system allocates, or assigns, a message processor to the node. An allocated message processor, in at least one embodiment, will be the sole processor of messages directed to the node for the period of time during which the message processor is allocated. A message processor assigned to a node may be unassigned, and a different message processor assigned to the node at a later time.

At 708, the graph processing system also allocates, or assigns, storage capacity for data associated with the node. This step may comprise determining a location for storing the node data. In at least one embodiment, the graph processing system uses storage on or connected to the same computing device as the message processor.

At 710, the graph processing system processes the message. The message is processed, in at least one embodiment, by a message processor in accordance with a defined order.

In at least one embodiment, a queue for storing messages is associated with the node. The messages are added to the queue for subsequent processing by the node's message processor. The message processor serially removes messages from the queue and processes them, in accordance with the order.

In at least one embodiment, the processing of a message by the message processor, as depicted in step 710, causes one or more events to be generated. The events may represent changes made to a node, such as a property being added, an edge removed, and so forth. These events may also be referred to as node events.

Figure 8:
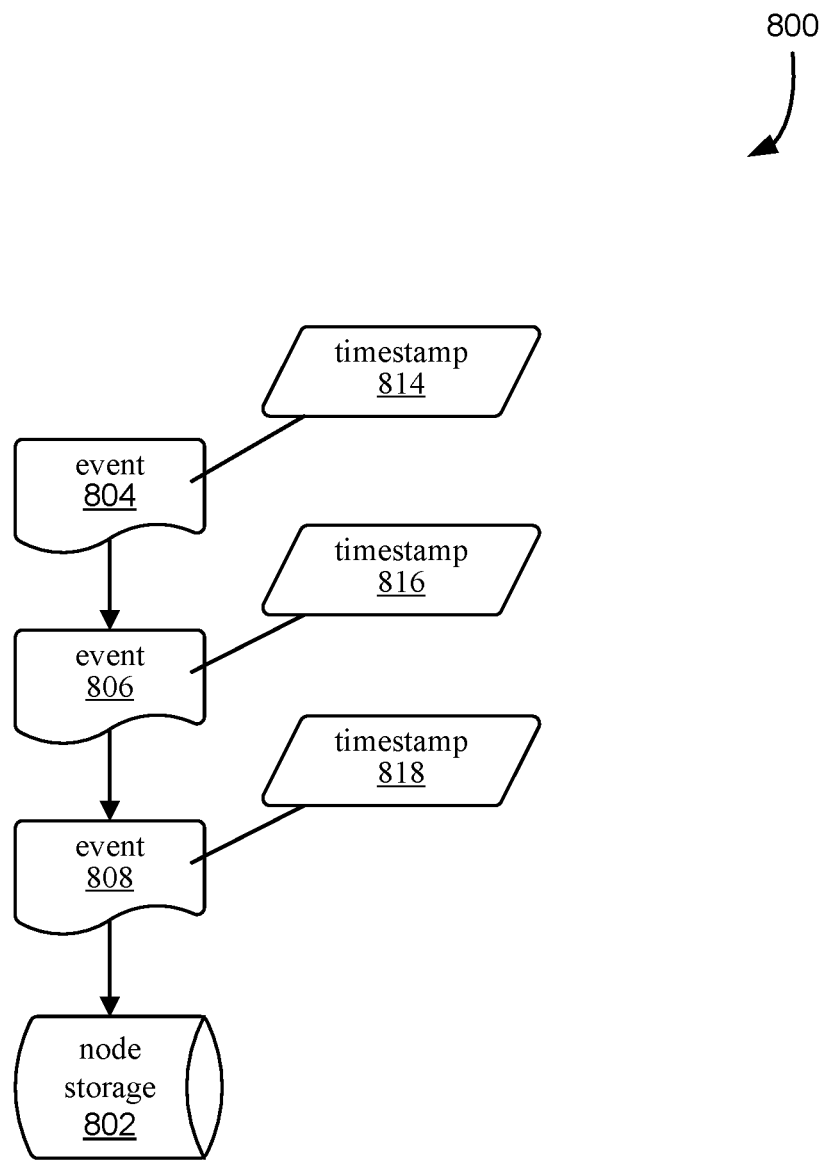
FIG. 8 illustrates an example of node event storage, in accordance with at least one embodiment.

FIG. 8 illustrates an example of node event storage, in accordance with at least one embodiment. The example 800 of FIG. 8 shows that node data may be stored in an append-only log of events associated with that node. The events may, in cases and embodiments, represent changes to a node, such as the addition, removal, or modification of a property or edge.

In at least one embodiment, the events 804-808 are stored in an append-only log in node storage 802. The node storage 802, in at least one embodiment, comprises a data structure suitable for maintaining an append-only log. Each of the events 804-808 may also comprise a corresponding timestamp 814-818.

In at least one embodiment, the events are replayed from the log in order to restore a node's state. When a previously-instantiated node is started, e.g. by having a message processor assigned to it, the events 804-808 may be read and processed, in order, until the state of the node has been brought up-to-date. Alternatively, rather than replaying all events, the system may replay events up to a desired time. By doing so, the node's restored state will correspond to the state of the node at a desired time.

Figure 9:
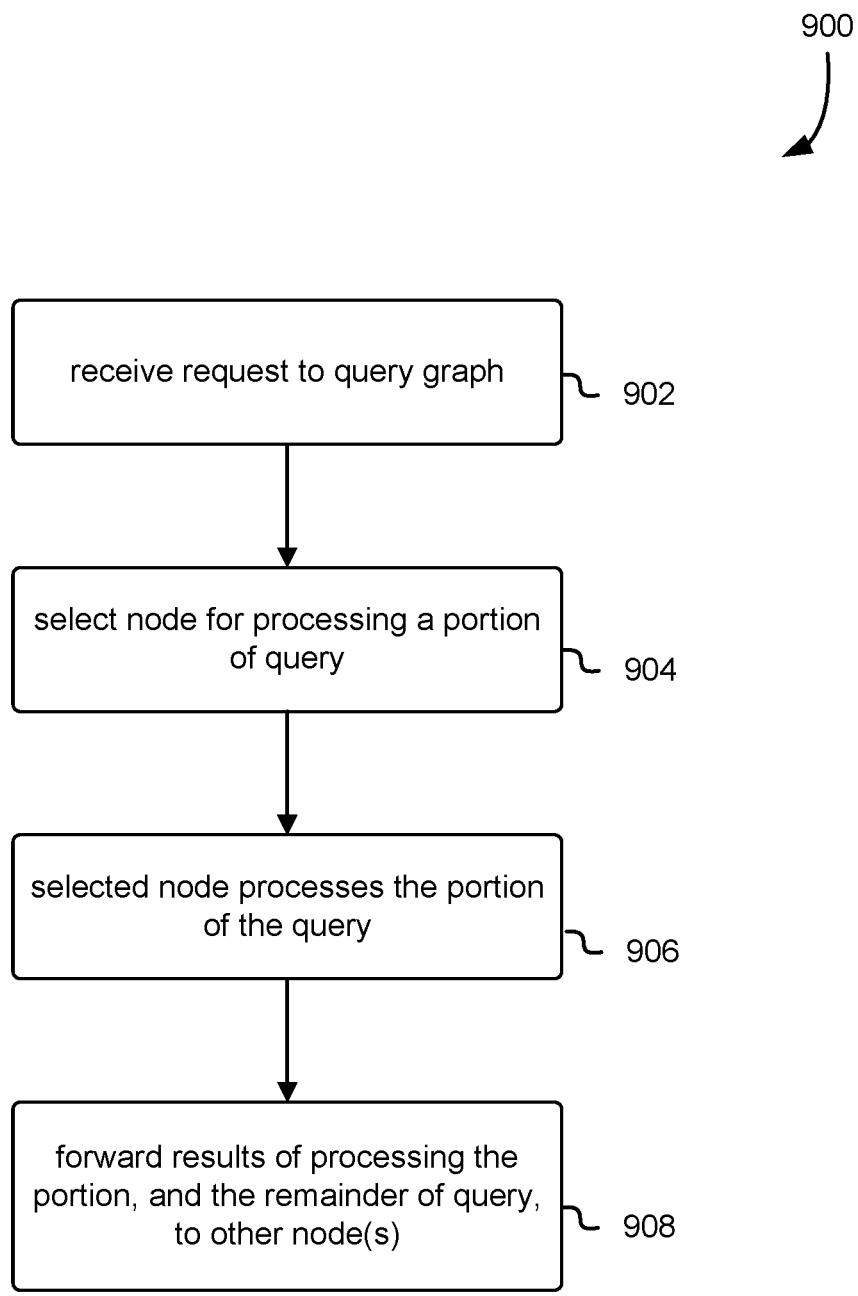
FIG. 9 is a flow diagram illustrating an example process for querying a graph, in accordance with at least one embodiment.

FIG. 9 is a flow diagram illustrating an example process for querying a graph, in accordance with at least one embodiment. It will be appreciated that the sequence of steps depicted in FIG. 9 is intended to be illustrative. In various embodiments, the example process may be performed using a sequence of steps that differs from the depicted sequence. For example, except where logically required, such as when the output of one step is used as input for a subsequent step, the depicted steps may be altered, omitted, combined with other steps, or performed in parallel.

The example process 900 of FIG. 9 may be performed on any suitable computing system, or combination of computing systems, such as by the graph processing system depicted in FIG. 1, or by one or more of the computing device depicted in FIG. 13.

At 902, the graph processing system receives a request to perform a query on a graph. in at least one embodiment, the query is received from a client as a set of class definitions. The class definitions may be provided in any of a number of programming languages. The graph processing system then converts these to an intermediate representation that has a hierarchical, tree-like, or graph-like structure.

At 904, the graph processing system selects a node for processing a portion of the query. The selected node may, in cases and embodiments, correspond to one whose properties conform to criteria defined in a portion of the query. For example, if the query has a hierarchical structure with a single root portion, the graph processing system might examine the root portion, identify the criteria expressed in that portion, and identify a node that conforms to that criteria. In another example, pattern-matching is performed, and a node conforming to the pattern is selected.

At 906, the node's message processor processes the portion of the query. In at least one embodiment, this comprises applying the query portion's instructions to the current node state, in order to generate a result, sometimes referred to as a local result or node result, for that portion of the query.

At 908, the results of processing the portion of the query are forwarded, along with the remainder of the query, to one or more other nodes. In at least one embodiment, the graph processing system selects a second portion of the query to process and identifies a node that conforms to a criteria or pattern associated with the second portion. The graph processing system then sends a message to that node, instructing it to process the second portion of the query. The message may be accompanied by the results obtained from processing the prior portion of the query. This process of node-by-node evaluation may continue until all required portions of the query have been successfully processed.

Figure 10:
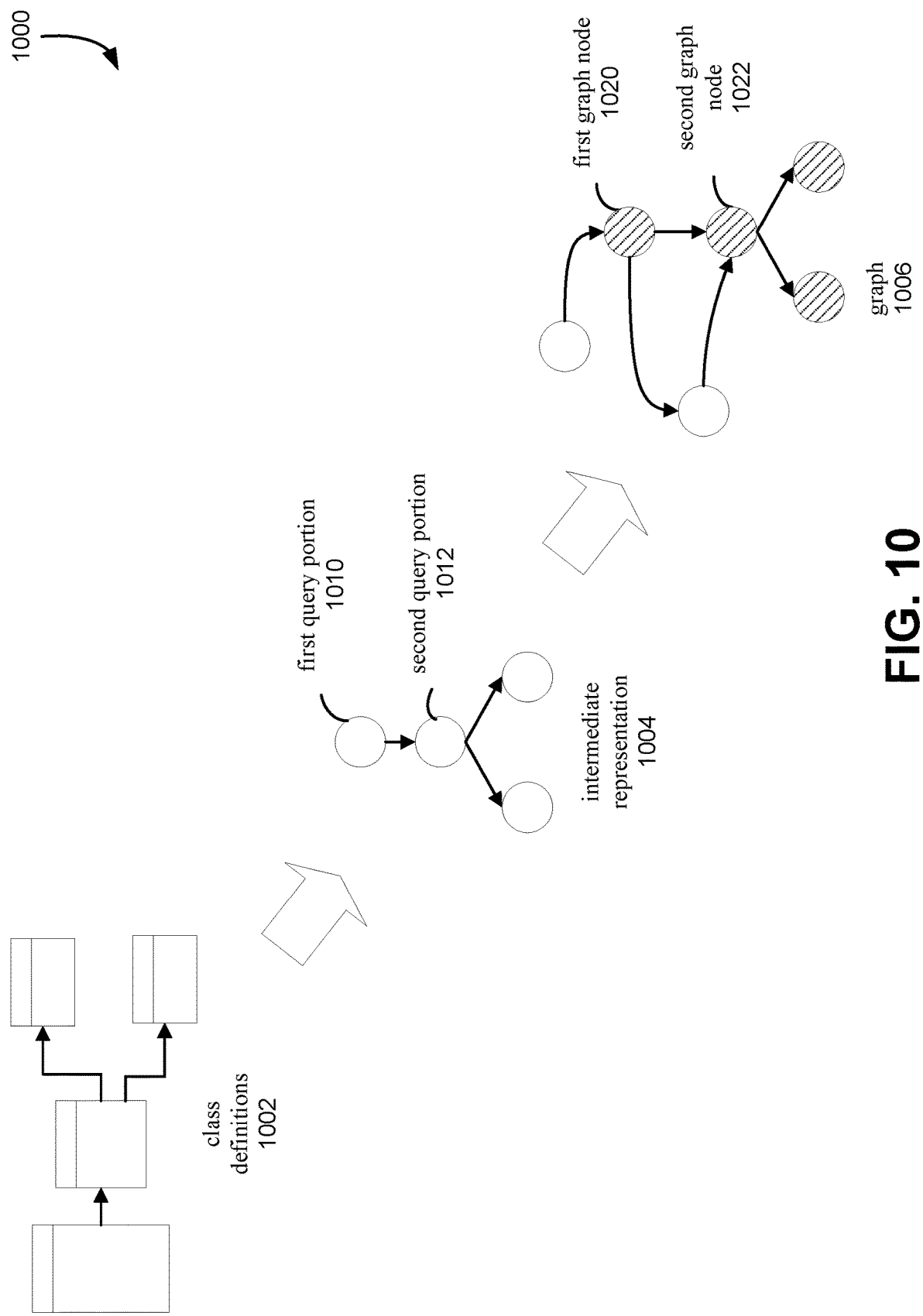
FIG. 10 illustrates further aspects of processing a query, in accordance with at least one embodiment.

FIG. 10 illustrates further aspects of processing a query, in accordance with at least one embodiment. As depicted in the example 1000, a set of class definitions 1002 defines a query. The class definitions 1002 are converted to an intermediate representation 1004 which has a hierarchical, tree-like, or graph-like structure. The query is then processed by identifying a region in the graph 1006 that conforms to the pattern defined by the query. For example, the graph processing system may process the first graph portion 1010 at a first graph node 1020, and then forward the local results from processing the first portion 1010 to the second graph node 1022. The second graph node can be selected, for example, based on some property of an edge between the two nodes, or simply because the two nodes are linked. It will be appreciated that these examples are intended to be illustrative, and as such should not be construed in a manner which would limit the scope of the present disclosure to only those embodiments which conform to the specific examples provided. The second node may then process the second query portion 1012. This process may complete until each query portion in the intermediate representation has been evaluated successfully, resulting in the location of a region of the graph that matches the pattern defined by the intermediate representation 1004. The evaluation of the query may, however, be ended prior to completion. This might occur, for example, if no suitable node can be found to continue evaluating the unevaluated portions of the query.

Figure 11:
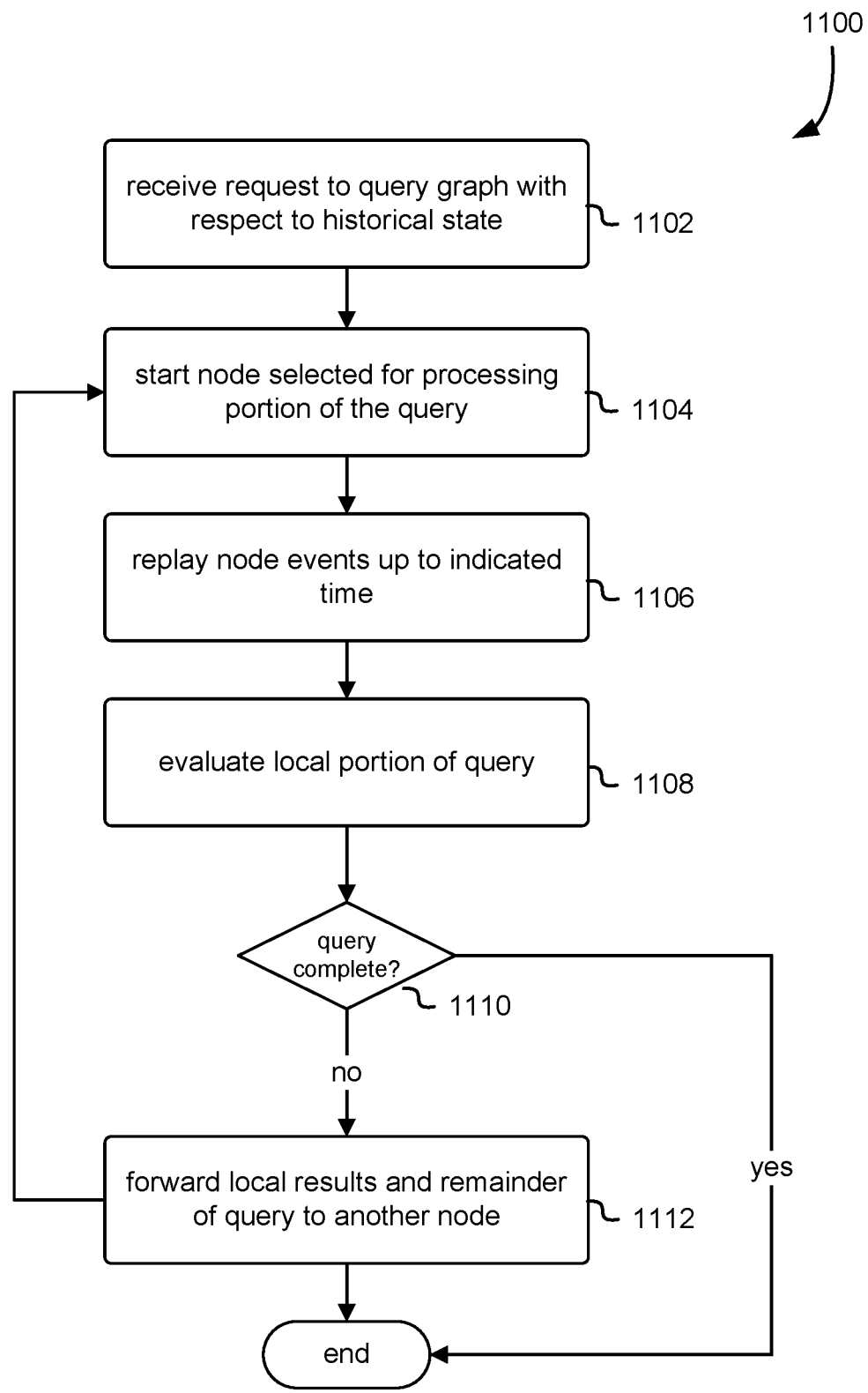
FIG. 11 is a flow diagram illustrating an example process of executing a query of a graph as of an indicated historical state, in accordance with at least one embodiment.

FIG. 11 is a flow diagram illustrating an example process of executing a query of a graph as of an indicated historical state, in accordance with at least one embodiment. It will be appreciated that the sequence of steps depicted in FIG. 11 is intended to be illustrative. In various embodiments, the example process may be performed using a sequence of steps that differs from the depicted sequence. For example, except where logically required, such as when the output of one step is used as input for a subsequent step, the depicted steps may be altered, omitted, combined with other steps, or performed in parallel.

The example process 1100 of FIG. 11 may be performed on any suitable computing system, or combination of computing systems, such as by the graph processing system depicted in FIG. 1, or by one or more of the computing devices depicted in FIG. 13.

At 1102, the graph processing system receives a request to query a graph with respect to a historical state. Here, historical state refers to the condition of the graph as of an earlier time, including the nodes, properties, edges, and other data as they were at the indicated time.

At 1104, the graph processing system starts a node of the graph that has been selected as a candidate for processing a portion of the query.

At 1106, the graph processing system replays node events up to the indicated time, which results in the state of the node being synchronized with the desired historical state.

At 1108, the node evaluates a local portion of the query, based on the historical state achieved at step 1106. Here, the portion of the query that the node will evaluate is referred to as the local portion.

If the query is not yet complete, as determined at step 1110, the evaluation of the query may continue by forwarding, at step 1112 the local results of the evaluation, along with the remaining portions of the query, to another node. This node may then be started, it's events replayed up to the indicated time, and its local portion evaluated. This process may then continue until evaluation of the query has been completed, or otherwise ended.

Figure 12:
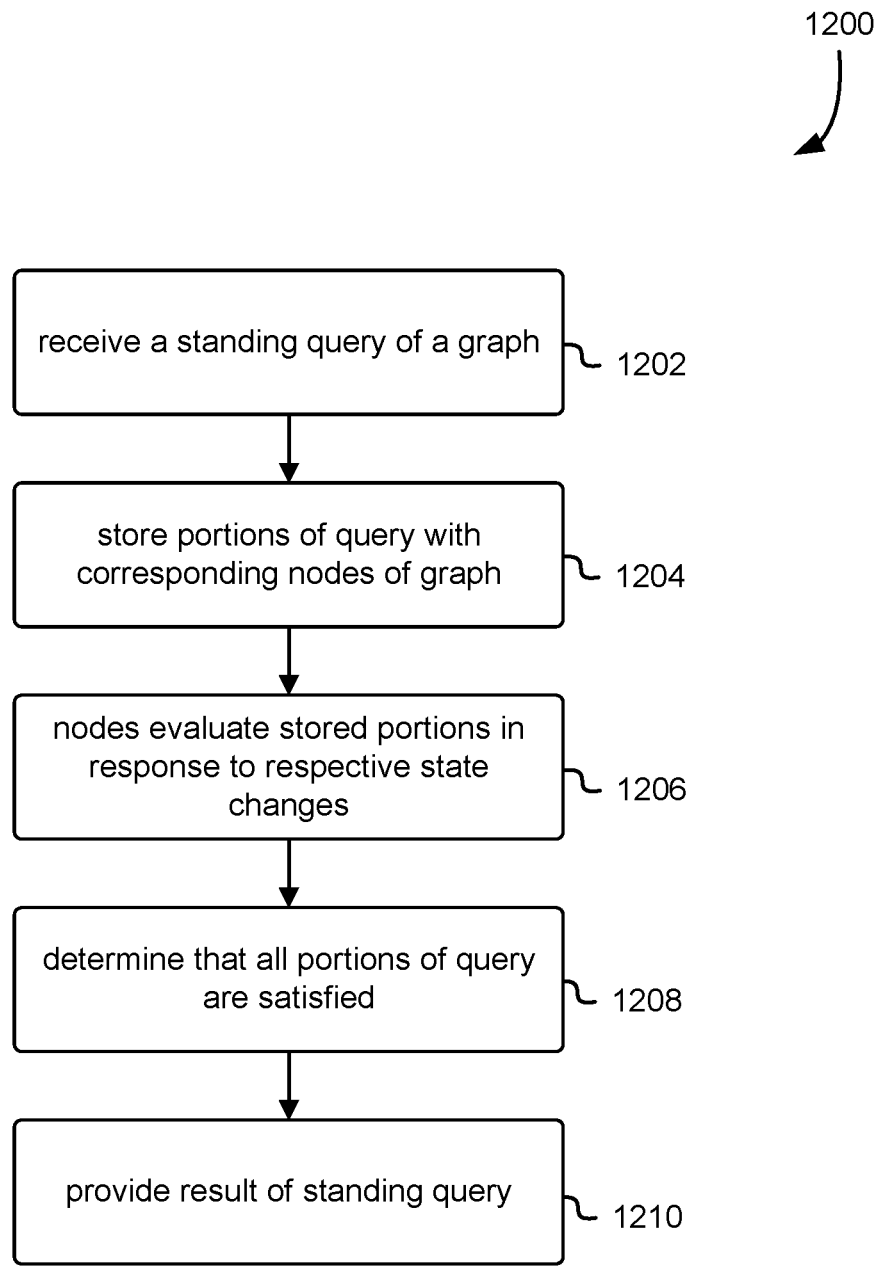
FIG. 12 is a flow diagram illustrating an example process of maintaining a standing query of a graph, in accordance with at least one embodiment.

FIG. 12 is a flow diagram illustrating an example process of maintaining a standing query of a graph, in accordance with at least one embodiment. It will be appreciated that the sequence of steps depicted in FIG. 12 is intended to be illustrative. In various embodiments, the example process may be performed using a sequence of steps that differs from the depicted sequence. For example, except where logically required, such as when the output of one step is used as input for a subsequent step, the depicted steps may be altered, omitted, combined with other steps, or performed in parallel.

The example process 1200 of FIG. 12 may be performed on any suitable computing system, or combination of computing systems, such as by the graph processing system depicted in FIG. 1, or by one or more of the computing device depicted in FIG. 13.

At 1202, the graph processing system receives a standing query of a graph. A standing query may refer to a query that is analogous, in at least some respects, to a subscription. When a client issues a standing query, it indicates that it wishes to receive a notification when the criteria or pattern defined by the standing query is matched.

At 1204, the graph processing system stores portions of the query with corresponding nodes of the graph. For the purpose of maintaining a standing query, a portion of the query may be said to correspond to a node when it would be appropriate for that node to process the corresponding portion. For example, certain portions of a query might be applicable only to nodes with certain properties.

At 1206, the nodes evaluate their stored query portions in response to a respective change to their state. For example, when a first node is updated, it may evaluate the stored query portion associated with it. A second node may do likewise, when its state changes, with its corresponding portion of the query.

At 1208, the graph processing system determines that all portions of the query have been satisfied. In other words, the system determines that the criteria or pattern has been satisfied or matched, based on the evaluations of the stored query portions as performed by the respective nodes.

At 1210, the graph processing system provides a result of the standing query, in response to the determination of step 1208.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a device or system, thereby causing the device or system to perform the specified operations.

In at least one embodiment, the graph processing system provides control over consistency trade-offs, such as providing support for ACID properties or for eventual consistency. For example, in at least one embodiment, at least one computing device performs a process comprising storing a graph of data as a plurality of nodes. The process further comprises receiving a query of the graph, where the query indicates a desired level of consistency for at least a portion of the query. The process further comprises identifying a timeframe that is in accordance with the desired consistency level. For example, strict conformance to ACID properties may indicate that the time must correspond closely to the time the query was received. Other forms of consistency may allow for use of any data from the time the query was issued up to the present. The process further comprises identifying a node to process the portion of the query, and confirming that the state of that node corresponds to a point in time that is within the indicated timeframe.

In a further aspect of the example process, the graph processing system returns results of the query that comprise data indicating the window of time used to process the query. For example, if processing the query involved a node state from time X, the results of the query might so indicate.

In a further aspect of the example process, additional queries, or query portions, may be executed using different consistency requirements.

In a further aspect of the example process, the desired consistency level may be achieved by acquiring a read lock and/or write lock on the node.

In a further aspect of the example process, the desired consistency level may be achieved by adjusting the node's state so that it conforms to the necessary timeframe. For example, if the current state of a node is based on a change made after the desired timeframe, the state of the node may be rolled back using data in the node's log storage. Likewise, if the node's current state is before the required timeframe, the state may be rolled forward.

FIG. 13 is an illustrative, simplified block diagram of a computing device 1300 that can be used to practice at least one embodiment of the present disclosure. In various embodiments, the computing device 1300 may be used to implement any of the systems illustrated and described above. For example, the computing device 1300 may be configured for use as a database or graph processing system. Embodiments of the computing device 1300 may include, but are not limited to, servers, web servers, portable computing devices, personal computers, smartphones, and other electronic computing devices. As shown in FIG. 13, the computing device 1300 may include one or more processors 1302 that, in embodiments, communicate with and are operatively coupled to a number of peripheral subsystems via a bus subsystem. In some embodiments, these peripheral subsystems include a storage subsystem 1306, comprising a memory subsystem 1308 and a file/disk storage subsystem 1310, one or more user interface input devices 1312, one or more user interface output devices 1314, and a network interface subsystem 1316. Such a storage subsystem 1306 may be used for temporary or long-term storage of information.

In some embodiments, the bus subsystem 1304 may provide a mechanism for enabling the various components and subsystems of computing device 1300 to communicate with each other as intended. Although the bus subsystem 1304 is shown schematically as a single bus, alternative embodiments of the bus subsystem utilize multiple buses. The network interface subsystem 1316 may provide an interface to other computing devices and networks. The network interface subsystem 1316 may serve as an interface for receiving data from and transmitting data to other systems from the computing device 1300. In some embodiments, the bus subsystem 1304 is utilized for communicating data such as details, search terms, and so on.

In some embodiments, the user interface input devices 1312 include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1300. In some embodiments, the one or more user interface output devices 1314 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1300. The one or more user interface output devices 1314 can be used, for example, to present user interfaces to facilitate user interaction with applications performing processes described and variations therein, when such interaction may be appropriate.

In some embodiments, the storage subsystem 1306 provides a non-transitory computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1306. These application modules or instructions can be executed by the one or more processors 1302. In various embodiments, the storage subsystem 1306 additionally provides a repository for storing data used in accordance with the present disclosure. In some embodiments, the storage subsystem 1306 comprises a memory subsystem 1308 and a file/disk storage subsystem 1310.

In embodiments, the memory subsystem 1308 includes a number of memories, such as a main random access memory (RAM) 1318 for storage of instructions and data during program execution and/or a read only memory (ROM) 1320, in which fixed instructions can be stored. In some embodiments, the file/disk storage subsystem 1310 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1300 includes at least one local clock 1324. The at least one local clock 1324, in some embodiments, is a counter that represents the number of ticks that have transpired from a particular starting date and, in some embodiments, is located integrally within the computing device 1300. In various embodiments, the at least one local clock 1324 is used to synchronize data transfers in the processors for the computing device 1300 and the subsystems included therein at specific clock pulses and can be used to coordinate synchronous operations between the computing device 1300 and other systems in a data center. In another embodiment, the local clock is a programmable interval timer.

The computing device 1300 could be of any of a variety of types, including a portable computer device, tablet computer, a workstation, or any other device described below. Additionally, the computing device 1300 can include another device that, in some embodiments, can be connected to the computing device 1300 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1300 for processing. Due to the ever-changing nature of computers and networks, the description of the computing device 1300 depicted in FIG. 13 is intended only as a specific example for purposes of illustrating the preferred embodiment of the device. Many other configurations having more or fewer components than the system depicted in FIG. 13 are possible.

The various embodiments disclosed herein may be further understood in view of the following clauses:

1. A system, comprising:
   a computing device comprising at least one processor and at least one memory, the at least one memory comprising instructions that, in response to execution by the at least one processor, cause the computing device to at least:
   receive at least one message indicative of storing data in a graph to comprise a first node linked to a second node;
   in response to determining that no message processor is assigned to the first node, assign a message processor to the first node, wherein the message processor processes messages directed to the first node in a defined order;
   store, based at least in part on the at least one message, a first record indicative of the first node, the first record comprising information indicative of a property of the first node and information indicative of a first half-edge associated with the second node; and
   store, based at least in part on the at least one message, in a second record indicative of the second node, information indicative of a second half-edge associated with the first node.

2. The system of clause 1, wherein the first node is associated with a globally unique identifier.

3. The system of any of clauses 1 and 2, wherein the first node is associated with one or more properties.

4. The system of any of clauses 1-3, wherein the computing device is one of a plurality of computing devices, and wherein a second one of the plurality of computing devices stores additional records indicative of additional nodes of the graph.

5. The system of any of clauses 1-4, wherein the first half-edge and second half-edge collectively define a link from the first node to the second node.

6. The system of any of clauses 1-5, wherein the at least one memory comprises further instructions that, in response to execution by the at least one processor, cause the computing device to at least:
   process messages directed to nodes of the graph up to a define point in the defined order; and process a query of the graph subsequent to processing the messages.

7. The system of clause 6, wherein the processed messages are constrained to a subset of nodes of the graph, the subset determined based at least in part on the query.

8. A computer-implemented method, comprising:
storing a graph of data as a plurality of nodes, wherein an edge between a first node and a second node, of the plurality of nodes, is represented by at least a first half-edge associated with the first node; and
associating each of the plurality of nodes with a message processor, wherein a message processor associated with a node processes messages directed to the respective node in a defined order.

9. The method of clause 8, wherein the first node is associated with a globally unique identifier.

10. The method of any of clauses 8 and 9, wherein the first node is associated with one or more properties.

11. The method of any of clauses 8-10, further comprising partitioning nodes of the graph between a plurality of computing devices.

12. The method of clause 11, wherein a first computing device, of the plurality of computing devices, stores the first node and the first half-edge, and a second computing device, of the plurality of computing devices, stores the second node and a second half-edge.

13. The method of any of clauses 8-12, wherein the first half-edge and a second half-edge collectively define a link between the first node and the second node.

14. The method of clause 13, further comprising storing a property associated with the link by at least storing an additional node comprising the property associated with the link, and associating the additional node with the first half-edge and the second half-edge.

15. The method of any of clauses 8-14, further comprising:
processing messages directed to nodes of the graph up to a define point in the defined order; and
processing a query of the graph subsequent to processing the messages.

16. The method of clause 15, further comprising:
determining a subset of nodes of the graph associated with a query; and
constraining the processed messages to the determined subset of nodes.

17. The method of any of clauses 8-16, further comprising:
storing a constraint with a node in the graph;
determine to preclude a change to the node based at least in part on the constraint.

18. The method of any of clauses 8-17, further comprising:
storing node data in a swappable back-end.

19. The method of any of clause 8-18, further comprising:
evaluating a query by at least treating a sub-graph as a single node for purposes of the evaluation.

20. The method of any of clauses 8-19, further comprising:
determining a value of a property based at least in part on lazily evaluating a portion of a query.

21. A system, comprising:
a computing device comprising at least one processor and at least one memory, the at least one memory comprising instructions that, in response to execution by the at least one processor, cause the computing device to at least:
store a graph of data as a plurality of nodes, wherein each node of the plurality of nodes is associated with a message processor;
receive a query of the graph;
evaluate, by a first message processor associated with a first node of the plurality of nodes, a first portion of the query;
identify, based on the evaluation of the first portion of the query, a second node for evaluating a second portion of the query;
send, by the first message processor, a message to the second node for evaluating the second portion of the query; and
generate a result of the query based at least in part on the evaluation of the first and second portions of the query.

22. The system of clause 21, wherein the query comprises a request to extend a sub-graph.

23. The system of clause 22, wherein the at least one memory comprises further instructions that, in response to execution by the at least one processor, cause the computing device to at least determine a starting location for the query by identifying a location of the sub-graph.

24. The system of any of clauses 21-23, wherein the message to the second node comprises results associated with the evaluation of the first portion.

25. The system of clause 24, wherein evaluation of the second portion is based at least in part on the results associated with the evaluation of the first portion.

26. A system, comprising:
a computing device comprising at least one processor and at least one memory, the at least one memory comprising instructions that, in response to execution by the at least one processor, cause the computing device to at least:
store a graph of data as a plurality of nodes, wherein each node of the plurality of nodes is associated with a message processor;
receive a standing query of the graph;
store, with a first node of the plurality of nodes, a first portion of the standing query;
store, with a second node of the plurality of nodes, a second portion of the standing query; and
generate a result of the standing query based at least in part on a determination by a first message processor of the first node that the first portion of the standing query is satisfied and a determination by a second message processor of the second node determines that the second portion of the standing query is satisfied.

27. The system of clause 26, wherein the standing query is associated with a callback function invoked at least upon generating the result of the standing query.

28. The system of any of clauses 26 and 27, wherein the at least one memory comprises further instructions that, in response to execution by the at least one processor, cause the computing device to at least:
in response to a determination that the standing query is satisfied, update one or more of the plurality of nodes.

29. The system of a clause 28, wherein the one or more of the plurality of nodes correspond to a pattern defined by the standing query.

30. The system of any of clauses 28 and 29, wherein the second node is subscribed to receive, from the first node, updates associated with the standing query.

31. A computer-implemented method, comprising:
storing a graph of data as a plurality of nodes;
storing an index node comprising information indicative of nodes, of the plurality of nodes, that have at least one of a property or an edge type indicated by a query; and selecting a first node for processing a first portion of the query, based at least in part on determining, based at least in part on the index node, that the first node has the at least one property or edge type.

32. The computer-implemented method of clause 31, further comprising:
processing messages directed to the first node, up to a defined point in a defined order; and
processing a query of the graph subsequent to processing the messages, wherein the query is processed based at least in part on the index node.

33. The computer-implemented method of any of clauses 31 and 32, wherein the index node subscribes to messages from nodes having the at least one property or edge type.

34. The computer-implemented method of any of clauses 31-33, further comprising:
selecting a second node for processing a second portion of the query, based at least in part on an additional index node.

35. A computer-implemented method, comprising:
receiving information, in a first programming language, indicative of a pattern applicable to one or more data entities;
generating, based at least in part on the pattern, an intermediate-language representation of a query of a graph; and
generating a result of the query by at least evaluating a first portion of the intermediate-language representation by a first message processor associated with a first node of the graph, and by at least evaluating a second portion of the intermediate language representation by a second message processor associated with a second node of the graph.

36. The computer-implemented method of clause 35, wherein the first programming language is a structured query language.

37. The computer-implemented method of any of clauses 35 and 36, wherein the first programming language is at least one of a procedural, object-oriented, or functional programming language.

38. The computer-implemented method of any of clauses 35-37, wherein the intermediate-language representation of the query comprises a tree structure, and wherein the tree structure comprises the first portion of the query and the second portion of the query.

39. The computer-implemented method of any of clauses 35-38, wherein the pattern is indicative of at least one of a relationship between the data entities, a property associated with at least one of the data entities, a function of the property, or a function of the relation.

40. The computer-implemented method of any of clause 35-39, further comprising:
translating a graph query language expression into an intermediate representation, wherein the intermediate representation comprises one or more literal operations on the graph.

41. The computer-implemented method of any of clauses 35-40, further comprising:
translating a structured query language expression into an intermediate representation, wherein the intermediate representation comprises one or more literal operations on the graph.

42. A computer-implemented method, comprising:
storing a graph of data as a plurality of nodes;
receiving a first query of the graph, wherein the first query indicates a consistency level associated with evaluating the first query;
identifying a timeframe that is in accordance with the desired level of consistency;
identifying a node, of the plurality of nodes, for processing a portion of the first query; and
processing the portion of the first query, based at least in part on a confirmation that a state of the node corresponds to a point in time within the timeframe.

43. The computer-implemented method of clause 42, further comprising:
returning results of the first query, the results comprising information indicative of a window of time in which the query was resolved, the window of time associated with the node state.

44. The computer-implemented method of any of clauses 42 and 43, wherein an additional query of the graph executes in parallel with the first query, and wherein the additional query indicates a desired level of consistency that is different than the desired level of consistency indicated by the first query.

45. The computer-implemented method of any of clauses 42-44, wherein the confirmation comprises acquiring a lock on the node.

46. The computer-implemented method of any of clauses 42-45, wherein the confirmation comprises adjusting the state of the node to be in accordance with the timeframe.

47. The computer-implemented method of any of clauses 42-46, wherein the query comprises an additional desired level of consistency applicable to a second portion of the query.

48. A non-transitory computer-readable storage medium comprising instructions that, when executed by at least one processor of at least one computing device, cause the at least one computing device to:
receive at least one message indicative of storing data in a graph to comprise a first node linked to a second node;
in response to determining that no message processor is assigned to the first node, assign a message processor to the first node, wherein the message processor processes messages directed to the first node in a defined order;
store, based at least in part on the at least one message, a first record indicative of the first node, the first record comprising information indicative of a property of the first node and information indicative of a first half-edge associated with the second node; and
store, based at least in part on the at least one message, in a second record indicative of the second node, information indicative of a second half-edge associated with the first node.

49. A non-transitory computer-readable storage medium comprising instructions that, when executed by at least one processor of at least one computing device, cause the at least one computing device to:
perform the computer-implemented method of any of clauses 8-20.

50. A non-transitory computer-readable storage medium comprising instructions that, when executed by at least one processor of at least one computing device, cause the at least one computing device to:
store a graph of data as a plurality of nodes, wherein each node of the plurality of nodes is associated with a message processor;
receive a query of the graph;
evaluate, by a first message processor associated with a first node of the plurality of nodes, a first portion of the query;
identify, based on the evaluation of the first portion of the query, a second node for evaluating a second portion of the query;

send, by the first message processor, a message to the second node for evaluating the second portion of the query; and generate a result of the query based at least in part on the evaluation of the first and second portions of the query.

51. A non-transitory computer-readable storage medium comprising instructions that, when executed by at least one processor of at least one computing device, cause the at least one computing device to:

store a graph of data as a plurality of nodes, wherein each node of the plurality of nodes is associated with a message processor;

receive a standing query of the graph;

store, with a first node of the plurality of nodes, a first portion of the standing query;

store, with a second node of the plurality of nodes, a second portion of the standing query; and generate a result of the standing query based at least in part on a determination by a first message processor of the first node that the first portion of the standing query is satisfied and a determination by a second message processor of the second node determines that the second portion of the standing query is satisfied.

52. A non-transitory computer-readable storage medium comprising instructions that, when executed by at least one processor of at least one computing device, cause the at least one computing device to:

perform the computer-implemented method of any of clauses 31-34.

52. A non-transitory computer-readable storage medium comprising instructions that, when executed by at least one processor of at least one computing device, cause the at least one computing device to:

perform the computer-implemented method of any of clauses 35-41.

53. A non-transitory computer-readable storage medium comprising instructions that, when executed by at least one processor of at least one computing device, cause the at least one computing device to:

perform the computer-implemented method of any of clauses 42-47.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated, and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media, and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments are envisioned. As such, embodiments of the present disclosure may be practiced otherwise than as specifically described. Accordingly, the scope of the present disclosure includes all modifications and equivalents of the subject matter recited in the clauses appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

What is claimed is:

1. A system, comprising:
   at least one processor; and
   at least one memory, comprising instructions that, in response to execution by the at least one processor, cause the system to at least:
      store a graph of data comprising a plurality of nodes;
      receive a standing query of the graph of data, the standing query indicative of a pattern to be matched in the graph of data;
      select a first node of the plurality of nodes to evaluate, by a first message processor associated with the first node, a first portion of the standing query, the first portion indicative of a first at least one criteria of a plurality of criteria associated with the standing query, wherein the first node is selected based at least in part on the first at least one criteria being applicable to at least one property associated with the first node;
      select a second node of the plurality of nodes to evaluate, by a second message processor associated with the second node, a second portion of the standing query, the second portion indicative of a second at least one criteria of the plurality of criteria associated with the standing query, wherein the second node is selected based at least in part on the second at least one criteria being applicable to at least one property associated with the second node;
      determine, by the first message processor associated with the first node, that the first portion of the standing query is satisfied, wherein the determination comprises applying the first at least one criteria to the at least one property to determine if the criteria is satisfied, and wherein the determination is made in response to a notification of another determination, by the second message processor associated with the second node, that the second portion of the standing query is satisfied; and
      generate a result of the standing query based, at least in part, on the determination by the first message processor that the first portion of the standing query is satisfied and the determination by the second message processor associated with the second node that the second portion of the standing query is satisfied, the result indicating a region of the graph that matches the pattern.

2. The system of claim 1, wherein the first message processor processes, in serial order, messages directed to the first node.

3. The system of claim 1, wherein the second node receives an indication that the first portion of the standing query has been satisfied.

4. The system of claim 1, wherein the standing query is associated with a callback function that is invoked to provide a result of the standing query.

5. The system of claim 1, wherein the at least one memory comprises further instructions that, in response to execution by the at least one processor, cause the system to at least:
   store portions of the standing query with corresponding portions of the graph, wherein correspondence between a portion of the query and a portion of the graph is based, at least in part, on applicability of portions of the query to properties of a node in the portion of the graph.

6. The system of claim 1, wherein the first message processor, in response to determining that the first portion of the standing query has been satisfied, sends a notification to the second message processor to indicate that the first portion of the standing query has been satisfied.

7. The system of claim 1, wherein nodes of the graph of data represent entities and edges of the graph of data represent relationships between entities.

8. The system of claim 1, wherein the second node relays, to the first node, results of processing the second portion of the standing query.

9. A method, comprising:
   storing a plurality of nodes of a graph, wherein a first node of the plurality of nodes is associated with a first message processor and a second node of the plurality of nodes is associated with a second message processor;
   selecting the first node to evaluate, by the first message processor, a first portion of a standing query of a graph, the standing query indicative of a pattern to be matched in the graph, the first portion indicative of a first at least one criteria of a plurality of criteria associated with the standing query, the first at least one criteria applicable to a property associated with the first node;
   selecting the second node to evaluate, by the second message processor, a second portion of the standing query, the second portion indicative of a second at least one criteria of the plurality of criteria associated with the standing query, the second at least one criteria applicable to a property associated with the second node;
   determining, by the first message processor associated with the first node, that the first portion of the standing query is satisfied, by at least determining that the property associated with the first node satisfies the first at least one criteria;

determining, by the second message processor associated with the second node, that the second portion of the standing query is satisfied; and returning a result of the standing query based, at least in part, on the determinations that the first and second portions of the standing query were satisfied, the result comprising an indication that the pattern was matched.

10. The method of claim 9, further comprising:
processing messages directed to the first node to determine if the first portion of the standing query is satisfied.

11. The method of claim 9, further comprising:
sending an indication, to the second node, that the first portion of the standing query has been satisfied.

12. The method of claim 9, further comprising:
returning the result of the standing query by calling a callback function associated with the standing query.

13. The method of claim 9, wherein one or more properties of the first node are applicable to one or more properties of the first portion of the query.

14. The method of claim 13, wherein the first and second nodes are indicative of a pattern defined by the standing query.

15. The method of claim 9, wherein a result of a decomposition of the query is stored in the first node.

16. A non-transitory computer-readable storage medium comprising instructions that, in response to execution by at least one processor of at least one computing device, cause the at least one computing device to at least:

store a plurality of nodes of a graph, wherein a first node of the plurality of nodes is associated with a first message processor and a second node of the plurality of nodes is associated with a second message processor;

associate a first portion of a standing query of a graph with the first node, the standing query indicative of a pattern to be matched in the graph, the first portion indicative of a first at least one criteria of a plurality of criteria associated with the standing query, the first at least one criteria applicable to a property associated with the first node;

associate a second portion of the standing query of the graph with the second node, the second portion indicative of a second at least one criteria of the plurality of criteria associated with the standing query, the second at least one criteria applicable to a property associated with the second node;

determine, by the first message processor, that the first portion of the standing query is satisfied, by at least determining that the property associated with the first node satisfies the first at least one criteria, wherein the first message processor sends the second message processor a notification that the first portion of the standing query has been satisfied;

determine, by the second message processor, that the second portion of the standing query is satisfied; and return a result of the standing query based, at least in part, on the determinations that the first and second portions of the standing query are satisfied, the result comprising an indication of a match in the graph of the pattern.

17. The non-transitory computer-readable storage medium of claim 16, comprising further instructions that, in response to execution by at least one processor of at least one computing device, cause the at least one computing device to at least:

send an indication, to the second node, that the first portion of the standing query has been satisfied.

18. The non-transitory computer-readable storage medium of claim 16, wherein the first and second nodes are indicative of a pattern defined by the standing query.

19. The non-transitory computer-readable storage medium of claim 16, comprising further instructions that, in response to execution by at least one processor of at least one computing device, cause the at least one computing device to at least:

convert the query to a representation comprising one or more operations on the graph.

20. The non-transitory computer-readable storage medium of claim 16, comprising further instructions that, in response to execution by at least one processor of at least one computing device, cause the at least one computing device to at least:

evaluate the first portion of the standing query in response to an update to the first node.

\* \* \* \* \*